No. 819,426. PATENTED MAY 1, 1906.
C. R. HARRIS.
HEATER AND DUPLEX BURNER.
APPLICATION FILED AUG. 17, 1904.
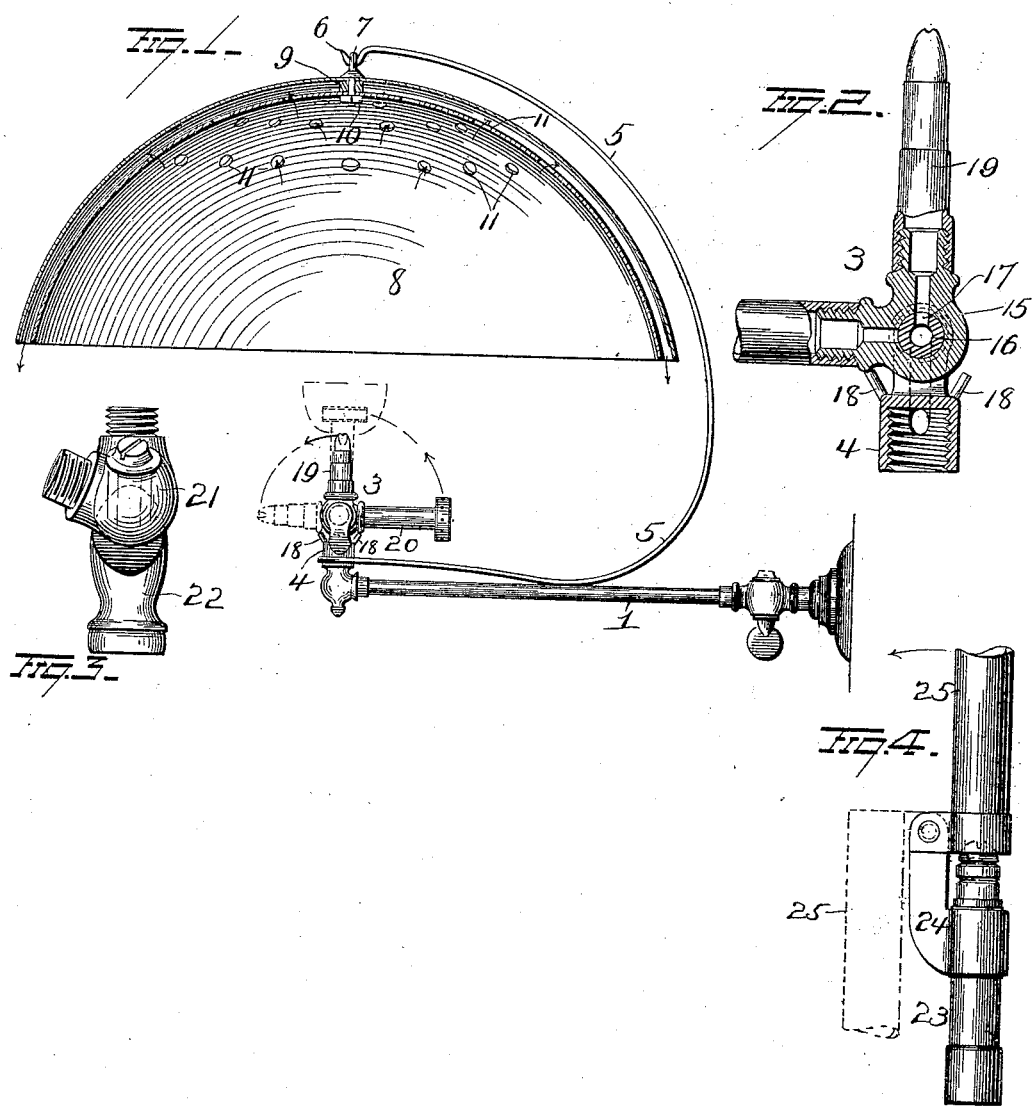
WITNESSES
INVENTOR
C. R. Harris
By H. A. Seymour
Attorney

UNITED STATES PATENT OFFICE.

CHARLES R. HARRIS, OF LOS ANGELES, CALIFORNIA.

HEATER AND DUPLEX BURNER.

No. 819,426.  Specification of Letters Patent.  Patented May 1, 1906.

Application filed August 17, 1904. Serial No. 221,085.

*To all whom it may concern:*

Be it known that I, CHARLES R. HARRIS, a resident of Los Angeles, in the county of Los Angeles and State of California, have invented certain new and useful Improvements in Heaters and Duplex Burners; and I do hereby declare the following to be a full, clear, and exact description of the invention, such as will enable others skilled in the art to which it appertains to make and use the same.

My invention relates to an improved heater and duplex burner, the object of the invention being to provide an improved heater which can be readily attached to any form of gas-bracket and to provide an improved duplex gas-burner which comprises a gas lighting and heating burner, either of which can be moved into or out of operative position at the will of the operator.

With this and other objects in view the invention consists in certain novel features of construction and combinations and arrangements of parts, as will be more fully hereinafter described, and pointed out in the claims.

In the accompanying drawings, Figure 1 is a view in vertical section illustrating one form of my improvements. Fig. 2 is a view in section of the duplex burner shown in Fig. 1, and Figs. 3 and 4 are views of modified forms of duplex burner.

1 represents a gas-bracket of ordinary construction, on which my improved duplex burner 3 is mounted, said burner having a threaded nipple 4 to screw onto the gas-bracket and at the same time securely hold a spring-arm 5 in place. This spring-arm 5 may be of the general bowed shaped shown or other shape desired and has a hook-shaped free end 6 to receive the eye of an eyebolt 7 in the center of a heater 8.

The heater 8 (shown in Fig. 1) comprises two parallel concavo-convex plates spaced apart by a washer 9, through which and the plates the eyebolt 7 is passed and secured by a nut 10. The lower plate is provided with a large number of perforations 11 in its upper central portion to receive the hot air and compel its downward deflection between the highly-heated plates and be radiated downward into the room.

The duplex burner (shown in Figs. 1 and 2) comprises an angle-coupling 15, having a conical bore to receive a conical tube or hollow journal 16 on nipple 4, and a nut is screwed onto the end of tube or journal 16 and tightly binds a washer against the coupling to secure the parts together, yet permit of free rotary movement of the coupling 15 on tube 16, and the latter has an opening 17 in its wall adapted to aline with either of the hollow sections of said coupling when turned to an upright position, and stops 18 are provided to limit the turning movement of the coupling.

Onto one section or member of the coupling 15 a lighting-burner 19 is screwed, and onto the other member an ordinary Bunsen heating-burner 20 is screwed, and it will be seen that when one is moved to a vertical operative position the other will be moved out of the way and the gas-passage thereto cut off, thereby enabling the employment of the lighting-burner at night and the heating-burner during the day, both of which will give the necessary flame to the heater above.

In the modification shown in Fig. 3 the coupling 21, to which the lighting and heating burners are to be connected, is pivotally supported, so that either of said burners may be moved into alinement with the bracket 22 supporting them.

In Fig. 4 an ordinary lighting-burner 23 is shown having a bracket 24 secured thereon, and to which latter a heating-burner tube 25 is hinged and adapted to be swung to a position above the lighting-burner, as shown, when heat alone is desired.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a gas pipe or bracket, of an angle-coupling pivotally mounted on said pipe or bracket, a heater over said coupling a lighting-burner attached to one arm of said pivoted coupling, a heating-burner attached to the other arm of said coupling for heating said heater, said burners having fixed relation to each other, whereby either of said burners can be moved into operative position and the other kept out of operative position.

2. The combination with a heater, and a gas pipe or bracket under the same, of an angle-coupling pivotally mounted on said pipe or bracket, a lighting-burner mounted on one arm of said coupling, and a heating-burner secured to the other arm of said coupling having fixed relation to the lighting-burner, whereby one of said burners can be disposed in operative position under the heater and the other burner moved away from such operative position so as to be out of reach of heat from the operating-burner.

In testimony whereof I have signed this specification in the presence of two subscribing witnesses.

CHAS. R. HARRIS.

Witnesses:
 M. L. CUSHING,
 CARL PAULY.